May 8, 1962 R. L. LARSEN ETAL 3,034,017
WARNING INDICATOR CONTROL APPARATUS
Filed July 2, 1959
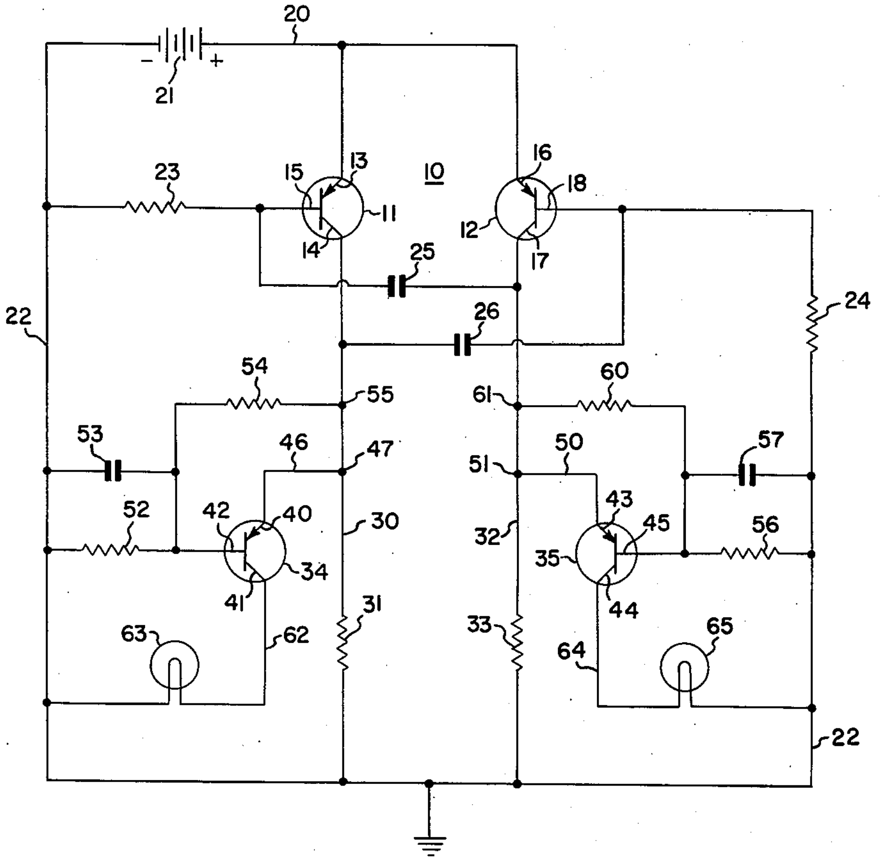
INVENTOR.
ROY L. LARSEN
CHARLES G. BROWN
BY Osmund R. Dahl
ATTORNEY 3,034,017

WARNING INDICATOR CONTROL APPARATUS

Roy L. Larsen, Norwood, and Charles G. Brown, South Weymouth, Mass., assignors to Minneapolis-Honeywell Regulator Company, Minneapolis, Minn., a corporation of Delaware Filed July 2, 1959, Ser. No. 824,635
13 Claims. (Cl. 315—205)

This invention relates generally to electronic control apparatus and relates more specifically to new and improved electronic switching circuits for controlling the power to a load device. In a slightly more detailed sense, the invention relates to a warning indicator apparatus system for applying energy pulses to the indicator which may be in the form of light producing means, or visual indicating means, or radiation means or other intermittently energized warning indicator. In the specific embodiment disclosed, the improved semiconductor switching circuit is utilized to control the power in a light flashing circuit of the type used as warning lights which operate repetitively at intervals of several seconds. This general type of device is often utilized in the field of highway warning lights in construction areas and the like.

In the past, the use of a multivibrator type circuit for use in highway light flasher apparatus has had as a principal disadvantage its 100% duty cycle. Since this type of flasher apparatus must by necessity be operated from battery power, it is desirable to reduce the duty cycle so that the average operating current be kept at a minimum in order that an extended time period of unattended service free operation can be obtained from the apparatus and to keep at a minimum the battery cost of operating the apparatus.

In the present invention this undesirable feature of prior equipment is overcome by providing a first relaxation oscillator type timing circuit for regulating the interval of time between light flashes, and by providing a further interconnected timing circuit independent of the basic circuit for independently controlling the pulse length of the energizing pulses to the load device.

It is an object of the present invention, therefore, to provide improved semiconductor switching circuits for controlling pulse energization of a load device.

A more specific object of the invention is to provide an improved electronically controlled light flasher in which the power consumption duty cycle is maintained at a minimum.

It is a further object of this invention to provide a fail-safe dual light flasher wherein a semiconductor multivibrator switching circuit controls the time interval between light flashes and wherein further electronic timing apparatus determines the time duration of the individual light flashes.

These and other objects of the present invention will be understood upon consideration of the accompanying specification, claims, and drawing, of which:

The single FIGURE is a schematic representation of an embodiment of the invention.

Referring now to the drawing, there is disclosed a relaxation oscillator type switching circuit 10 in the form of a transistor multivibrator. The multivibrator comprises a pair of transistors 11 and 12, here disclosed as junction type PNP transistors. The transistor 11 has an emitter electrode 13, a collector electrode 14, and a control or base electrode 15, and similarly the transistor 12 has an emitter electrode 16, a collector electrode 17 and a control or base electrode 18. The emitter and collector electrodes may also be referred to as the switching electrodes. The emitter electrodes 13 and 16 are connected by a conductor 20 to the positive terminal of the source of potential 21, here shown as a battery. The negative terminal of the source is connected to ground potential by a ground conductor 22.

A pair of biasing resistors 23 and 24 connect the control electrodes 15 and 18, respectively, to the ground conductor 22. A coupling capacitor 25 interconnects the control electrode 15 of transistor 11 with the collector electrode 17 of the transistor 12, and a coupling capacitor 26 connects the base electrode 18 of transistor 12 with the collector electrode 14 of transistor 11. The collector electrode 14 is connected to the ground potential through a conductor 30 and a collector load resistor 31. Likewise, the collector electrode 17 of transistor 12 is connected by a conductor 32 and a collector load resistor 33 to ground potential.

The above described components comprise the basic circuit elements of the main multivibrator switching circuit which preferably may be of the free-running variety, and which is effective to determine a cycling frequency of the flasher apparatus.

The circuit also discloses third and fourth transistors 34 and 35. A transistor 34 has an emitter electrode 40, a collector electrode 41, and a control or base electrode 42, and the transistor 35 has an emitter electrode 43, a collector electrode 44, and a control electrode 45. The emitter electrode 40 of transistor 34 is connected by a conductor 46 to a junction 47 on the conductor 30. The emitter electrode 43 of transistor 35 is connected by a conductor 50 to a junction 51 on the conductor 32. The control electrode 42 is connected to ground conductor 22 by means of a resistor 52, the resistor being parallel by a capacitor 53. A resistor 54 also interconnects the control electrode 42 with a junction 55 on the conductor 30.

A control electrode 45 of transistor 35 is connected to ground by means of a resistor 56 which has in parallel therewith a capacitor 57. Control electrode 45 is also connected by a resistor 60 to a junction 61 on the conductor 32.

The collector electrode 41 of transistor 34 is connected by a conductor 62 to one terminal of a suitable load device 63, here shown as an incandescent lamp. The other terminal of the load is connected to ground conductor 22. Similarly, the collector electrode 44 of transistor 35 is connected through a conductor 64 to one terminal of a load device 65, which may be of the same type as load 63, the other terminal of the load device being grounded.

In considering the over-all operation of the circuit, it may be advantageous to consider the circuit as one which provides an electronic timer within a timer, or stated slightly differently which comprises a switch within a switch. As has been mentioned above, the basic multivibrator switch 10, which comprises the transistors 11 and 12 and the associated components, preferably functions as a free running multivibrator with the two transistors alternately being rendered conductive. As an alternative, multivibrator 10 may be a bistable type which is pulsed from one condition to the other by a suitable pulse source, not shown. In the circuit as disclosed, the resistors 23 and 24 and the capacitors 25 and 26 determine the timing of the main multivibrator 10.

Considering the operation of the multivibrator 10 in greater detail, let it be assumed that the transistor 11 is conducting and transistor 12 cutoff. A current path may be traced for a biasing current from the positive terminal of the battery source 21 through the conductor 20, through the input circuit of the transistor from the emitter 13 to base electrode 15, and through the resistor 23 and the conductor 22 to the negative terminal of the source 21. A potential charge on the capacitor 25 provides a regenerative feedback to the base electrode 15 which aids the bias current above described to maintain the transistor 11 fully conductive. A further current path may be traced from the positive terminal of the source 21 through the output circuit of transistor 11 from emitter 13 to collector 14, through the conductor 30 and the resistor 31 to the negative terminal of the source. A second timing circuit which parallels the resistor 31 will be discussed in detail below.

After a time period determined by the magnitude of the capacitors 25 and 26 and the resistors 23 and 24, the conductivity status of the two transistors 11 and 12 reverses in the conventional multivibrator mode of operation, such that transistor 12 becomes conductive and transistor 11 is maintained cutoff. A biasing current can be traced from the source through the transistor 12 from the emitter 16 to base electrode 18 and through the resistor 24 and the conductor 22 to the negative terminal of the source. A regenerative feedback from the collector electrode 14 of transistor 11 through the capacitor 26 aids the bias current to maintain the transistor 12 fully conductive. The feedback from collector 17 of transistor 12 through the capacitor 25 is now effective to maintain the transistor 11 fully cutoff. The output current path through transistor 12 may be traced from the positive terminal of the source 21 through conductor 20, from emitter 16 to collector 17, through the conductor 32 and the resistor 33 and back to the negative terminal of the source.

It should now be apparent that as the multivibrator 10 operates, a substantially square wave potential appears across the resistor 31, and that a similar square wave potential appears across the resistor 33, the two square wave potentials being out of phase in accordance with the alternate conduction of transistors 11 and 12.

It has previously been mentioned that one of the disadvantages of utilizing a multivibrator circuit of the type above described for energizing load devices is that a 100% duty cycle is imposed on the battery source. For this reason the resistors 31 and 33 are chosen with as high a value of resistance as practical in order to minimize the steady state current of the multivibrator and improve the efficiency of the apparatus.

More detailed consideration will now be given to the transistor 34, the capacitor 53 and the resistors 52 and 54 which comprise the switch within a switch for determining the effective duty cycle of the circuit. Considering now the instant of time at which the multivibrator 10 switches to render transistor 11 conductive, a positive square wave potential appears across the resistor 31. In addition to the current flowing through the resistor 31, a current path can also be traced from the junction 47 on conductor 30, through conductor 46, from emitter 40 to base electrode 42 of transistor 34 and through the capacitor 53 to the negative terminal of the source 21. The pulse of current flowing through this circuit, which rapidly charges the capacitor 53, renders the transistor 34 conductive and a further current path can be traced from the junction 47 through the transistor 34 from emitter 40 to collector 41, through the conductor 62 and through the warning lamp load 63 to the negative terminal of the source 21 thereby energizing the lamp. Since the time required to charge the capacitor 53 is very brief compared to the cycling time of the multivibrator 10, the conductive period of transistor 34 is likewise brief and the flasher light 63 produces a brief pulse of light, the time duration of which is determined by the charging time of the capacitor 53.

An identical circuit comprising the transistor 35, the capacitor 57, the resistors 60 and 56, are effective to control the pulse duration of current to the warning lamp 65 in the same manner as described for the warning lamp 63. The load current for illuminating the lamp 63 thus flows through both the transistor 11 and the transistor 34, and similarly, the current flowing to illuminate transistor 65 must flow through both the transistor 12 and the transistor 35. It can be seen, therefore, that the multivibrator circuit 10 is designed to determine the timing interval betwen flashes of the lamps 63 and 65, that is, each time the multivibrator flips from one condition to the other a flash is produced in one of the warning lamps, and the second timing circuit comprising the transistors 34 and 35 and their respective associated components determine the duration of the lamp energizing pulses. The current drawn from the source 21 is very large during the brief periods the lamps are energized as compared to the remainder of the cycle.

With the above described circuit, the heavy current load pulses comprise only a small fraction of the operating cycle of the apparatus and result in efficiency of operation. The operation of the multivibrator 10 is not dependent in any way upon the transistors 34 and 35 or the load lamps 63 or 65, and because of the dual load, one lamp will continue to flash even though the other fails, thereby providing a fail-safe feature of operation. The resistors 54, 52, 60, and 56 provide circuit stabilization and the stabilizing scheme may be modified by the use of temperature coefficient resistors to provide a self-compensating circuit over wide temperature ranges.

Although the switching circuit disclosed is of the free running multivibrator type, it will be apparent that the multivibrator could be a gated type or a one shot or a blocking oscillator. It is also apparent that although the load has been disclosed as a lamp device the invention is not intended to be limited to a lamp load.

In one satisfactory embodiment of the invention the following components were used:

| | |
|---|---|
| Transistors 11, 12, 34, 35 | Mpls.-Honeywell power PNP type. |
| Capacitors 25, 26, 53, 57 | 100 mfd. 6 v. electrolytic. |
| Resistors 23, 34 | 10,000 ohms. |
| Resistors 52, 56 | 27,000 ohms. |
| Resistors 31, 33 | 2000 ohms. |
| Resistors 54, 60 | 240 ohms. |
| Lamps 63, 65 | #1850 GE. |
| Source 21 | 6 volt. |

Various other modifications may become apparent to those skilled in the art, and it is our intention that we be limited solely by the scope of the appended claims and not by the specific embodiment of our invention which is disclosed herein for the purpose of illustration only.

We claim:

1. Electric control apparatus comprising: first semiconductor switching means having a plurality of electrodes comprising switching electrodes and a control electrode; signal producing control means connected to said control electrode to cause said semiconductor means to cylically switch from a conductive condition to a non-conductive condition; second semiconductor switching means connected in series with the switching electrodes of said first switching means; second signal producing control means connected to said second semiconductor switching means for causing switching thereof, said second switching means being controlled to have a shorter conductive period than said first switching means; load means; circuit means including said first and second semiconductor switching means connecting said load means to an electrical source for cyclically energizing said load means during the period that both said first and second semiconductor switching means are conductive.

2. Electric flasher apparatus comprising: first semiconductor switching means having a plurality of electrodes comprising switching electrodes and a control electrode; signal producing control means connected to said control electrode to cause said semiconductor means to cyclically switch from a conductive condition to a non-conductive condition; second semiconductor switching means connected in series with the switching electrodes of said first switching means; further signal producing control means connected to said second semiconductor switching means, said second switching means being thereby controlled to have a shorter conductive period than said first switching means; light producing means; circuit means including said first and second semiconductor switching means connecting said light producing means to an electrical source for cyclically energizing said light means during the period that both said first and second semiconductor switching means are conductive.

3. Electrical warning indicator apparatus comprising: first semiconductor switching means having a plurality of electrodes comprising switching electrodes and a control electrode; first signal producing control means connected to said control electrode to cause said semiconductor means to cyclically switch from a conductive condition to a non-conductive condition; second semiconductor switching means connected in series with the switching electrodes of said first switching means; second signal producing control means connected to said second semiconductor switching means, said second switching means being thereby controlled to have a shorter conductive period than said first switching means; warning indicator means; circuit means including said first and second semiconductor switching means connecting said warning indicator means to an electrical source for cyclically energizing said indicator means during the period that both said first and second semiconductor switching means are conductive.

4. Electric warning indicator apparatus comprising: first semiconductor switching means having a plurality of electrodes comprising switching electrodes and a control electrode; first signal producing control means connected to said control electrode to cause said semiconductor means to cyclically switch from a conductive condition to a non-conductive condition; second semiconductor switching means connected in series with the switching electrodes of said first switching means; second signal producing control means connected to said second semiconductor switching means, said second switching means being controlled to have a shorter conductive period than said first switching means; visual indicating means; circuit means including said first and second semiconductor switching means connecting said visual indicating means to an electrical source for cyclically energizing said indicating means during the period that both said first and second semiconductor switching means are conductive.

5. Electrical warning apparatus comprising: first semiconductor switching means having a plurality of electrodes comprising switching electrodes and a control electrode; signal producing control means connected to said control electrode to cause said semiconductor means to cyclically switch from a conductive condition to a non-conductive condition; second semiconductor switching means connected in series with the switching electrodes of said first switching means; further signal producing control means connected to said second semiconductor switching means, said second switching means being controlled to have a shorter conductive period than said first switching means; radiation load means; circuit means including said first and second semiconductor switching means connecting said radiation load means to an electrical source for cyclically energizing said radiation load means during the period that both said first and second semiconductor switching means are conductive.

6. Electric control apparatus comprising: transistor relaxation oscillator circuit means adapted to be energized from a direct current source and connected to cause said transistor means to cyclically switch from a conductive condition to a non-conductive condition to provide an intermittent current path therethrough; further semiconductor switching means connected in series with said transistor means; pulse producing means connected to said further switching means for rendering conductive said further switching means simultaneously with said relaxation oscillator means and being controlled to have a relatively short conductive period compared to said relaxation oscillator means; load means; circuit means including said transistor means and said further semiconductor switching means connecting said load means to said electrical source for causing cyclic energization of said load means only during the recurring periods that both said transistor means and said further semiconductor switching means are simultaneously conductive.

7. Electric warning indicator apparatus comprising: transistor relaxation oscillator circuit means adapted to be energized from a direct current source and connected to cause said transistor means to cyclically switch from a conductive condition to a non-conductive condition to provide an intermittent current path therethrough; further semiconductor switching means connected in series with said transistor means; signal producing means connected to said further switching means for rendering conductive said further switching means simultaneously with said relaxation oscillator means and being controlled to have a relatively short conductive period compared to said relaxation oscillator means; warning indicator load means; circuit means including said transistor means and said further semiconductor switching means connecting said warning indicator means to said electrical source for causing cyclic energization of said indicator means only during the recurring periods that both said transistor means and said further semiconductor switching means are simultaneously conductive.

8. Light flasher apparatus comprising: transistor relaxation oscillator circuit means adapted to be energized from a direct current source and connected to cause said transistor means to cyclically switch from a conductive condition to a non-conductive condition to provide an intermittent current path therethrough; further semiconductor switching means connected in series with said transistor means, said further switching means being rendered conductive simultaneously with said relaxation oscillator means and being controlled to have a relatively short conductive period compared to said relaxation oscillator means; light producing means; circuit means including said transistor means and said further semiconductor switching means connecting said light producing means to said electrical source for causing cyclic energization of said light producing means only during the recurring periods that both said transistor means and said further semiconductor switching means are simultaneously conductive.

9. Warning indicator control apparatus comprising: first transistor switching means; second transistor switching means; indicator means; circuit means connecting said first and second transistor switching means and said indicator means in series to a source of potential, said indicator means being energized only upon the simultaneous conduction of both of said transistor switching means; first bias producing timing means connected in controlling relation to said first transistor switching means and effective to periodically bias said first transistor switching means to a conductive condition for a predetermined time; and second timing means having a short timing period compared to said first timing means, said second timing means connected in controlling relation to said second transistor switching means and being effective upon said first transistor means becoming conductive to switch said second transistor means to a conductive condition for a brief interval to energize said indicator means, said first timing means determining the interval between successive cycles and said second timing means determining the indicating interval duration.

10. Warning indicator control apparatus comprising: first semiconductor current controlling switching means; second semiconductor current controlling switching means; indicator means; circuit means connecting said first and second switching means and said indicator means in series to a source of potential, said indicator means being energized only upon the simultaneous conduction of both of said switching means; first bias producing timing means connected in controlling relation to said first semiconductor switching means and effective to periodically bias said first switching means to a conductive condition for a predetermined time; and second timing means having a short timing period compared to said first timing means, said second timing means connected in controlling relation to said second switching means and being effective upon said first switching means becoming conductive to switch said second switching means to a conductive condition for a brief interval to energize said indicator means, said first timing means determining the interval between successive cycles and said second timing means determining the indicating interval duration.

11. Electric control apparatus comprising: transistor multivibrator means adapted to be energized from a direct current source and connected to cause said transistor means to cyclically switch from a conductive condition to a non-conductive condition to provide an intermittent current path therethrough; further semiconductor switching means connected in series with said transistor multivibrator means, said further switching means being rendered conductive simultaneously with said multivibrator means and being controlled to have a relatively short conductive period compared to said multivibrator means; load means; circuit means including said transistor means and said further semiconductor switching means connecting said load means to said electrical source for causing cyclic energization of said load means only during the recurring periods that both said transistor means and said further semiconductor switching means are simultaneously conductive.

12. Warning indicator apparatus comprising: transistor multivibrator means adapted to be energized from a direct current source and comprising first and second transistor means cross coupled to cause said first and second transistors to cyclically and oppositely switch from a conductive condition to a nonconductive condition, to provide a first intermittent current path through said first transistor means and to provide a second intermittent current path through said second transistor means; third and fourth semiconductor switching means connected in series with said first and second transistor means, respectively, said third switching means being rendered conductive simultaneously with said first transistor means and being controlled to have a relatively short conductive period compared to said first transistor means, said fourth switching means being rendered conductive simultaneously with said second transistor means and being controlled to have a relatively short conductive period compared to said second transistor means; first and second load means; circuit means including said first and second transistor means and said third and fourth semiconductor switching means connecting said first and second load means to said electrical source for causing cyclic and alternate energization of said first and second load means, respectively, during the recurring periods that the associated transistor means had semiconductor switching means are simultaneously conductive.

13. Light flasher indicator apparatus comprising: transistor multivibrator means adapted to be energized from a direct current source and comprising first and second transistor means cross coupled to cause said first and second transistors to cyclically and oppositely switch from a conductive condition to a nonconductive condition, to provide a first intermittent current path through said first transistor means and to provide a second intermittent current path through said second transistor means; third and fourth semiconductor switching means connected in series with said first and second transistor means, respectively, said third switching means being rendered conductive simultaneously with said first transistor means and being controlled to have a relatively short conductive period compared to said first transistor means, said fourth switching means being rendered conductive simultaneously with said second transistor means and being controlled to have a relatively short conductive period compared to said second transistor means; first and second light producing means; circuit means including said first and second transistor means and said third and fourth semiconductor switching means connecting said first and second light producing means to said electrical source for causing cyclic and alternate energization of said first and second light means, respectively, during the recurring periods that the associated transistor means and semiconductor switching means are simultaneously conductive.

References Cited in the file of this patent

UNITED STATES PATENTS

| | | |
|---|---|---|
| 2,829,257 | Root | Apr. 1, 1958 |
| 2,878,298 | Giacoletto | Mar. 17, 1959 |
| 2,891,195 | Smyth | June 16, 1959 |
| 2,892,966 | Smyth | June 30, 1959 |